Sept. 30, 1952     P. D. ZEMANY     2,612,048
THERMOMETER
Filed Sept. 13, 1950
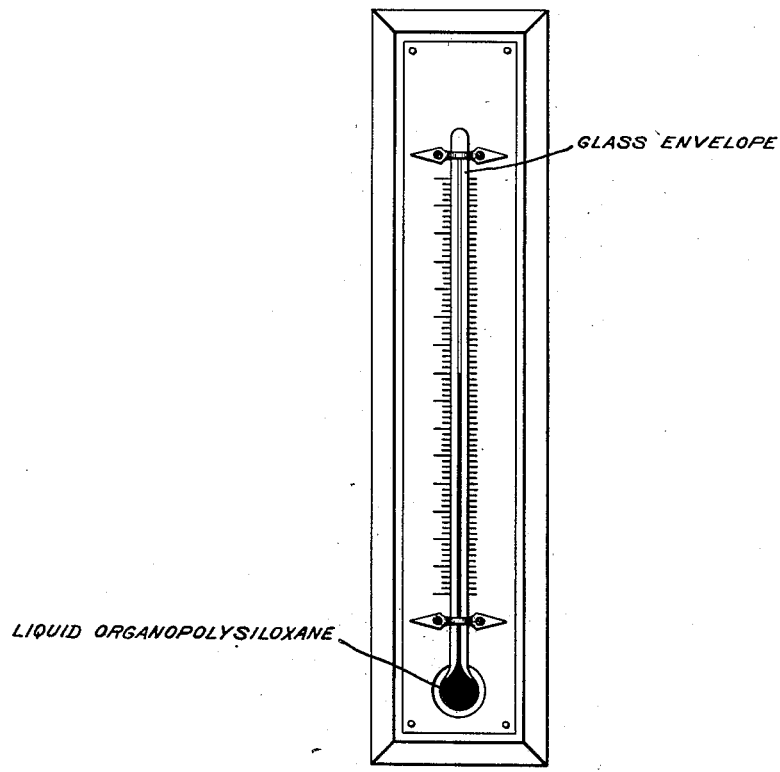
Inventor:
Paul D. Zemany,
by [signature]
His Attorney.

Patented Sept. 30, 1952

2,612,048

UNITED STATES PATENT OFFICE 2,612,048

THERMOMETER

Paul D. Zemany, Schenectady, N. Y., assignor to General Electric Company, a corporation of New York Application September 13, 1950, Serial No. 184,577

3 Claims. (Cl. 73—371)

This invention is concerned with novel thermometers having liquid organopolysilaxanes as the indicating fluid.

Heretofore various thermometers have been employed using different kinds of liquids as the temperature indicating medium. Among such liquids employed have been mercury, pentane, alcohol, etc. Each of the foregoing liquids is useful within a certain temperature range and once the temperature range is exceeded it is necessary to resort to another thermometer containing a different fluid as indicating medium. This of course involves many inconveniences and results in undesirable operations. Moreover many of the liquids normally used in thermometers do not have a satisfactory expansion coefficient which will make them adaptable over a sufficiently large temperature range, and if attempts are made to use them over too extensive a temperature range, they may either solidify or volatilize so as to be useless outside the temperature range for which they are originally intended. Also many of the fluids used heretofore have viscosity changes which are relatively large compared with temperature changes, which again makes it disadvantageous to use them outside of very limited temperature range. Finally, the contact angle with the glass of the usual indicating fluids is very often either concave or convex, and due to the capillary depression or elevation, it causes an accentuation of errors if there should be any irregularity in the bore of the capillary tube. This would result in a larger temperature reading error than would be the case if the altered volume caused by the irregularity were the only factor affecting the reading of the temperature.

I have now discovered that all the aforementioned difficulties can be obviated either completely or to a large extent by employing thermometers in which the indicating fluid in the transparent container is a liquid organopolysiloxane, preferably one having a low viscosity for example of the order from about 3 to 100 centistokes and where the ratio of organic groups to silicon atoms is around 2.0 to 3. Such organopolysiloxanes include both the cyclic organopolysiloxanes having organic to silicon ratios of about 2.0 to 1, as well as chain-stopped linear organopolysiloxanes having organic to silicon ratios above 2, for example, 2.2 to 2.5 organic groups per silicon atom. The various liquid organopolysiloxane which can be employed in the practice of the present invention may be found, for example, in Patnode Patents 2,469,888 and 2,469,890, issued May 10, 1949 and assigned to the same assignee as the present invention. Additional examples of liquid organopolysiloxanes which may advantageously be employed in the practice of the present invention may also be found in Wilcock et al. Patent 2,469,889, issued May 10, 1949 and assigned to the same assignee as the present invention, as well as in Ford et al. Patent 2,456,496, issued December 14, 1948. If desired, chain-stopped methyl hydrogen siloxanes such as those described in Wilcock Patent 2,491,843, issued December 20, 1949, may also be employed in the practice of the present invention.

The accompanying drawing shows a thermometer of ordinary form having a transparent glass container in which the liquid organopolysiloxane is used in place of mercury for the expansible fluid.

The properties of the silicones employed in the practice of my invention which make them admirably suitable for the thermometer application are many. They have an extremely high very close to linear expansion coefficient. Moreover, these compositions are liquid over a very long temperature range which permits them to be used for measuring temperatures over a much wider range as compared to other expansible fluids where it is necessary to change thermometers in order to go to a different temperature range. In addition, the organopolysiloxanes are particularly adaptable for the claimed purpose in that they have a low vapor pressure throughout most of their liquid range and are chemically stable in glass. Their viscosity changes relatively little with temperature. Finally, what is most important in many sensitive temperature measurements is the fact that at the contact angle of the glass of the liquid silicone oil is such that it forms a nearly flat meniscus in the transparent capillary tube. Finally, because of the advantages described above, it is possible to use capillary tubes which are not as fine as those now in use and which may have larger bores thus making it easier to assemble, and provide less chance for the thread of the measuring column of liquid to break as very often happens in the case of alcohol thermometers.

In order that those skilled in the art may better understand how the present invention may be practiced the following example is given by way of illustration.

*Example 1*

A bulb with a capillary tube having an inside diameter of about 3 mm. attached thereto was filled with mercury. The same and other similar tubes were filled with two different trimethylsilyl chain-stopped methyl polysiloxanes of the type described in the aforementioned two Patnode patents. One silicone oil had a viscosity of about 20 centistokes while the other silicone oil had a viscosity of about 60 centistokes. Each thermometer was then used to simulate a thermometer. In each case the thermometer using the silicone oils exhibited greatly improved points of superiority over the mercury-filled thermometer and could be used over a much wider temperature range than it was possible to do with the mercury thermometer. Using the two organopolysiloxane-filled thermometers, the temperature could be measured easily beyond the end of the mercury range, and down through a good portion of the alcohol range, which obviously is a great advantage in many commercial processes.

It will of course be apparent to those skilled in the art that instead of the liquid methyl polysiloxanes employed above other organopolysiloxanes, e. g., methyl and phenyl-substituted polysiloxanes, other alkyl polysiloxanes, e. g., ethyl, propyl, butyl, isobutyl, etc., polysiloxanes described previously and more particularly disclosed in the patents listed above may be used without departing from the scope of the invention.

My claimed thermometers can be used in carrying out sensitive reactions where careful control of temperature is essential and where extremes of temperature may be encountered during reaction whereby it is highly desirable that such extremes in temperature may be measurable by one instrument, namely, the thermometer.

What I claim as new and desire to secure by Letters Patent of the United States is:

1. A thermometer comprising a sealed transparent capillary tube and a connecting bulbous reservoir, and a temperature indicating fluid in said capillary tube and reservoir consisting of a liquid organopolysiloxane having a viscosity of the order from about 3 to 100 centistokes and having a ratio of from 2.0 to 3.0 organic groups per silicon atom, the aforesaid organic groups being attached to the silicon atoms by carbon-silicon linkages and being selected from a class consisting of methyl and phenyl radicals.

2. A thermometer comprising a sealed transparent capillary tube and a connecting bulbous reservoir, and a temperature indicating fluid therein consisting of a liquid methyl chain-stopped methyl polysiloxane having a viscosity of about 20 centistokes and containing an average of from about 2.0 to 3.0 methyl groups per silicon atom, the said methyl groups being attached to the silicon atoms by carbon-silicon linkages.

3. A thermometer comprising a sealed transparent capillary tube and a connecting bulbous reservoir, and a temperature indicating fluid therein consisting of a liquid methyl chain-stopped methyl and phenyl polysiloxane having a viscosity of about 60 centistokes and containing an average of from about 2.0 to 3.0 total methyl and phenyl groups per silicon atom, the said methyl and phenyl groups being attached to the silicon atoms by carbon-silicon linkages.

PAUL D. ZEMANY.

REFERENCES CITED

The following references are of record in the file of this patent:

UNITED STATES PATENTS

| Number | Name | Date |
|---|---|---|
| 935,940 | Steinmetz | Oct. 5, 1909 |
| 1,779,066 | Halsey | Oct. 21, 1930 |
| 2,363,451 | Stockstrom | Nov. 21, 1944 |
| 2,397,727 | Daudt | Apr. 2, 1946 |